United States Patent [19]
Lutz

[11] Patent Number: 5,834,056
[45] Date of Patent: Nov. 10, 1998

[54] PROCESS AND APPARATUS FOR FIBER BUNDLE IMPREGNATION

[75] Inventor: Andreas Lutz, Stelzenberg, Germany

[73] Assignee: Institut Fuer Verbundwerkstoffe GmbH, Kaiserslautern, Germany

[21] Appl. No.: 722,152

[22] PCT Filed: Apr. 19, 1995

[86] PCT No.: PCT/EP95/01476

§ 371 Date: Nov. 7, 1996

§ 102(e) Date: Nov. 7, 1996

[87] PCT Pub. No.: WO95/28266

PCT Pub. Date: Oct. 26, 1995

[30] Foreign Application Priority Data

Apr. 19, 1994 [DE] Germany .......................... 44 13 501.7

[51] Int. Cl.[6] .................. B05D 3/12; B05C 11/00
[52] U.S. Cl. ................. 427/175; 427/429; 118/244; 118/264
[58] Field of Search .................. 427/172, 175, 427/429; 118/244, 264, 266, 271; 87/1, 23

[56] References Cited

U.S. PATENT DOCUMENTS 3,157,536 11/1964 Caines ........................................ 118/266
4,968,534 11/1990 Bogardy .................................... 427/282

*Primary Examiner*—Katherine A. Bareford
*Attorney, Agent, or Firm*—Oblon, Spivak, McClelland, Maier & Neustadt, P.C.

[57] ABSTRACT

The invention relates to a fibre bundle impregnating process, in which the fibre bundle is placed on a support and the support, together with the fibre bundle thereon, is moved past an impregnating device. In this process the fibre bundle is supported during the impregnation process and consequently a fibre-reinforced plastic is produced, fibre breaks being largely avoided during its production. One of the possible variants of the inventive concept comprises an impregnating wheel, which receives the fibre bundle and leads it past an impregnating device.

8 Claims, 5 Drawing Sheets

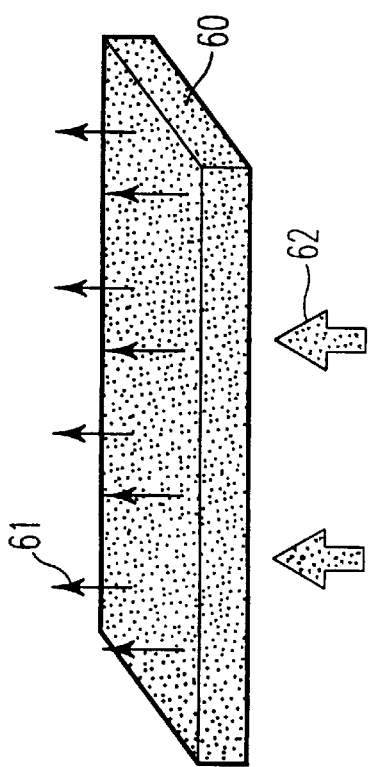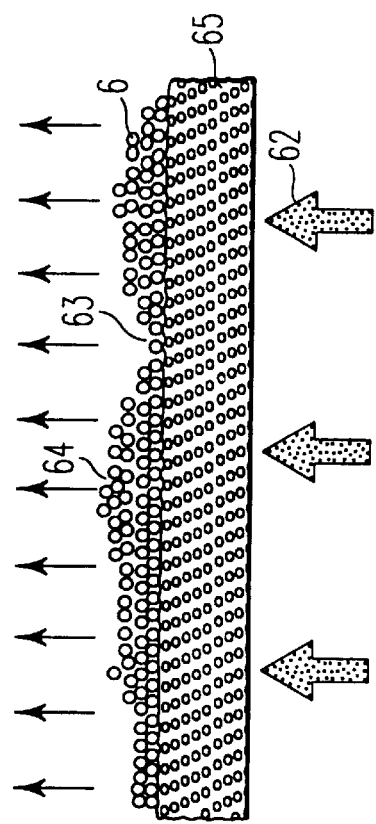

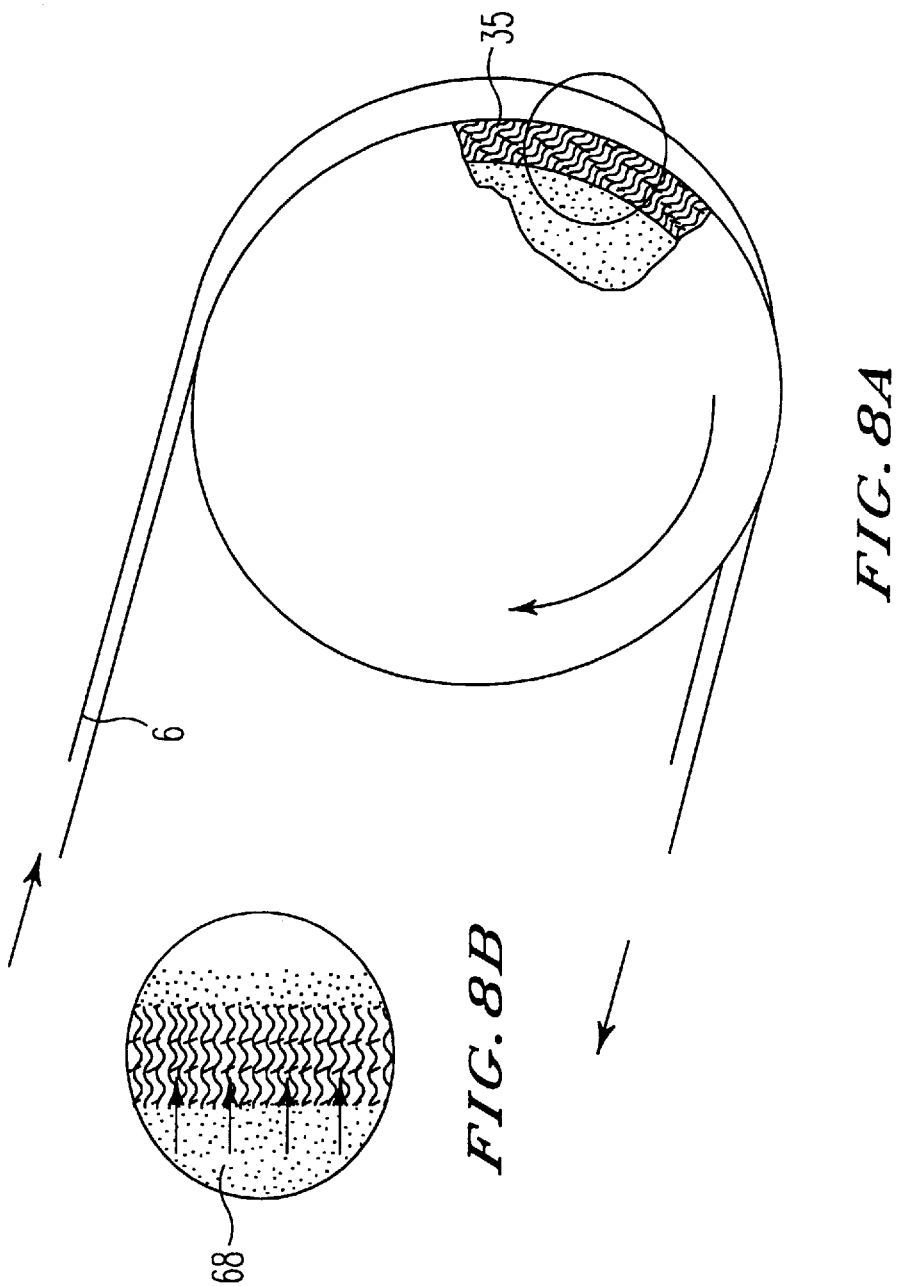

PROCESS AND APPARATUS FOR FIBER BUNDLE IMPREGNATION

This is a national stage application of PCT/EP 95/01476, filed Apr. 19, 1995.

BACKGROUND OF THE INVENTION

Field of the Invention

Discussion of the Background

Such a process is known from EP 415 517 B1. This document describes a procedure with a one-sided impregnating direction, in which an elevated system pressure of the liquid matrix material is built up at right angles to the fibre bundle. The fibre bundle is drawn via a nozzle head and the matrix material is forced through at right angles to the bundle movement direction. In this process the tribological stressing of the fibre bundle is high and the quality of the material produced can be reduced by a plurality of individual filament breaks in the fibre bundle. The filaments in a fibre bundle are often in the form of accumulations, i.e. not uniformly distributed over the fibre bundle cross-sectional surface.

As a result of this non-uniform distribution the flowing matrix melt splits the fibre bundle and consequently the matrix flows through the gap and not through the fibre bundle to be impregnated. However, even without the splitting of the fibre bundle the matrix always attempts to follow the path of least resistance, i.e. it only penetrates the fibre bundle where the thickness of the latter is at a minimum. This means that points having a large number of superimposed filament layers are inadequately impregnated.

Problems during impregnation are the high viscosities of the matrix materials and the high break sensitivity of the individual filaments within the fibre bundle. The individual filaments are very close together and it is difficult to uniformly impregnate all round the filaments with the matrix material. It is also necessary to ensure that within the impregnated fibre bundle, also known as a tape, no air inclusions or inadequately wetted zones are formed, which greatly reduce the strength, stiffness and other mechanical characteristics of the fibre bundle.

SUMMARY OF THE INVENTION

The object of the invention is to provide a process of the aforementioned type, in which there is a particularly good impregnation of the fibre bundle or some other fibre preform (e.g. fibre mats) in the case of a high throughput and at the same time filament breaks can be largely prevented. In addition, an apparatus is to be provided for performing the process according to the invention.

According to the basic concept of the invention the fibre bundle is carried along on a support during the impregnating process. The fibre bundle is supported by the support and led past the impregnating device. Thus, there is no relative movement between the fibre bundle and fixed parts of the impregnating device. Thus, abrasion processes, a high tribological stressing of the fibre bundle and also the impregnating tool are avoided. As a result of the supporting action of the support, the fibre bundle is effectively relieved, even in the case of a high impregnating pressure. As a result of the use of a support filament breaks are largely avoided and consequently the quality of the impregnated fibre bundle is improved.

In an advantageous further development the fibre bundle is secured on the support by additional measures. This leads to a particularly good contact between the bearing surface and the fibre bundle, so that the fibre bundle is particularly well protected against compressive loading during the impregnating process. This can be achieved by simply tensioning the fibre bundle, e.g. by guiding said bundle over a braked roll.

Matrix material is supplied to the fibre bundle in the following way. With the aid of a pressure built up in the feed mechanism (extruder), in the liquid state the matrix material is forced through a permeable bearing surface and then further guided through the fibre bundle. It is also possible to have a matrix material supply from the other side, i.e. initially through the fibre bundle and then through the support, provided that no use is made of the described uniform through-flow principle. In both cases the support fulfils its supporting function.

For reducing the pressure it is advantageous for the impregnating process to take place over a maximum large area. Then the impregnation can be performed with limited pressure and a constant quality and consequently a fibre-reinforced plastic with very few filament breaks is produced.

The main advantages of this process are that the fibre bundle is not subject to abrasion during the impregnating process as a result of relative movements between the fibre bundle and the impregnating station, because according to the invention virtually all relative movements between filaments of the fibre bundle and components of the impregnating station are avoided. It is possible to regulate within wide ranges the volume percentage of fibre to matrix material. It is also possible in this process to achieve a very high discharge quantity and keep the matrix overflow to a very low level. As a result of the described construction of the support, a complete impregnation, even in the case of non-uniform filament distribution over the fibre bundle width is ensured.

In a particularly advantageous development of the invention use is made of an impregnating wheel as the support. In the case of an impregnating wheel with a fixed hub only the contact surface or tread is rotatable and made permeable for the liquid matrix material. As the contact surface rotates with the drawing-off speed of the fibre bundle, there is no relative movement between the substrate and the fibre bundle. There is no filament rubbing against fixed machine parts and filament breaks caused by abrasion cannot arise.

The impregnating device and further means for performing the process can be positioned in the vicinity of the fixed wheel hub. The impregnating area widened with respect to a small nozzle permits a lower impregnating pressure. The fibres are not subject to a pressure surge, as occurs with an impregnating nozzle and instead are gently impregnated until the desired degree of impregnation is reached at the end of the impregnating area. The throughput can be randomly increased by the time extension of the impregnating process, i.e. the impregnating time, which can be brought about by increasing the impregnating wheel diameter.

A further throughput increase is achieved in that several fibre bundles are guided in juxtaposed manner, i.e. in parallel on the impregnating wheel and simultaneously the width of the latter is made appropriate for several juxtaposed bundles. The throughput can once again be increased at random.

The path of the liquid matrix from the interior of the impregnating tool up to the fibre bundle, i.e. the residence time of the molten matrix in said tool is short. This means that the risk that due to a long thermostatic control of the matrix could lead to damage, e.g. in the form of thermal deterioration is limited. Due to the open construction rapid access to all components is possible and the setting-up time is correspondingly short.

In a further development of the invention the fibre bundles are heated prior to impregnation, e.g. this can take place by hot air. The separation of the impregnated fibre bundle can also be improved by the inflow of thermostatically controlled air, which is under elevated pressure.

In another further development, several impregnating wheels can be successively arranged and can contrarotate. This can be advantageous in some cases and can also lead to a further throughput rise due to faster drawing-off speeds for the fibre bundles.

In another further development in the vicinity of the support, which is not covered by the fibre bundle, is fitted a contact surface cleaning device. Thus, there is always a well prepared contact surface for receiving the fibre bundle and which has virtually no matrix residues.

In other embodiments the support can e.g. comprise a rotating belt or rotating chain links or also a bearing surface with a return mechanism.

Frequently used fibre materials are glass, carbon or aramide fibres. Standard matrix materials are thermosetting and thermoplastic materials. However, the process according to the invention is not restricted to these materials and instead numerous materials can be used in the production of fibre-reinforced materials.

BRIEF DESCRIPTION OF THE DRAWINGS

The invention is described in greater detail hereinafter relative to the attached drawings, wherein show:

FIG. 6 A diagrammatic representation of the flow through a homogeneous body.

FIG. 7 A diagrammatic representation of the flow through a permeable support.

FIG. 8 A diagrammatic, part sectional view of an impregnating wheel with a larger scale detail.

DETAILED DESCRIPTION OF THE PREFERRED EMBODIMENTS

Figure 1:
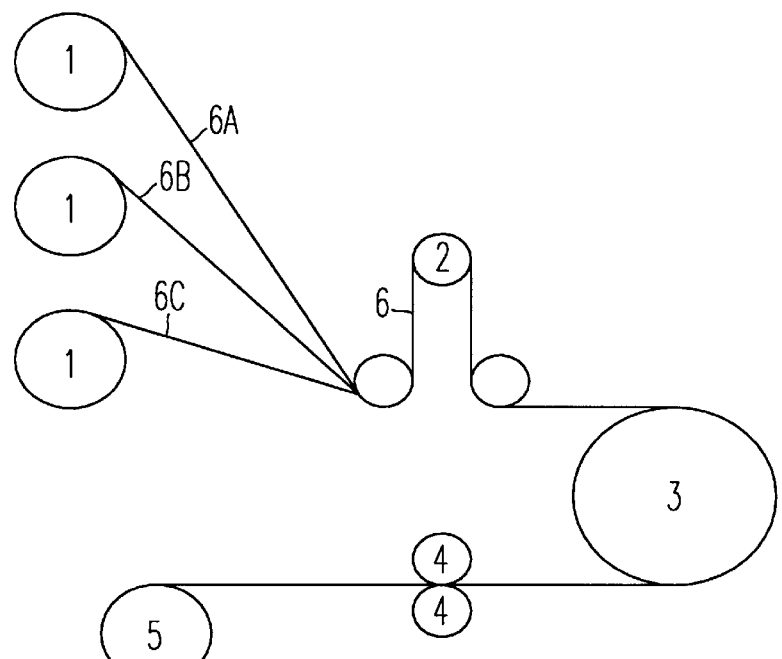
FIG. 1 A diagrammatically represented overall construction of an apparatus according to the invention.

FIG. 1 shows a diagrammatic overall construction of an apparatus according to the invention. If necessary, the impregnating process begins with the merging of small fibre bundles, which are supplied from holders 1. The number of small fibre bundles required is a function of the desired strength and thickness of the finished fibre bundle. FIG. 1 shows three small fibre bundles 6a, 6b and 6c. The merged fibre bundle 6 can be brought to the necessary tensile stress by deflecting the fibre bundle by means of a braked roll 2.

At this point starts the action zone of the impregnating station according to the invention and which in FIG. 1 is constructed as an impregnating wheel 3. Following the actual impregnating process a shaping device 4 can be rendered available for the subsequent shaping of the fibre bundle, so that it can then be rolled onto a roll 5 as a finished, impregnated fibre bundle. Immediately after leaving the impregnating wheel, the impregnated fibre bundle can also undergo further processing.

Figure 2:
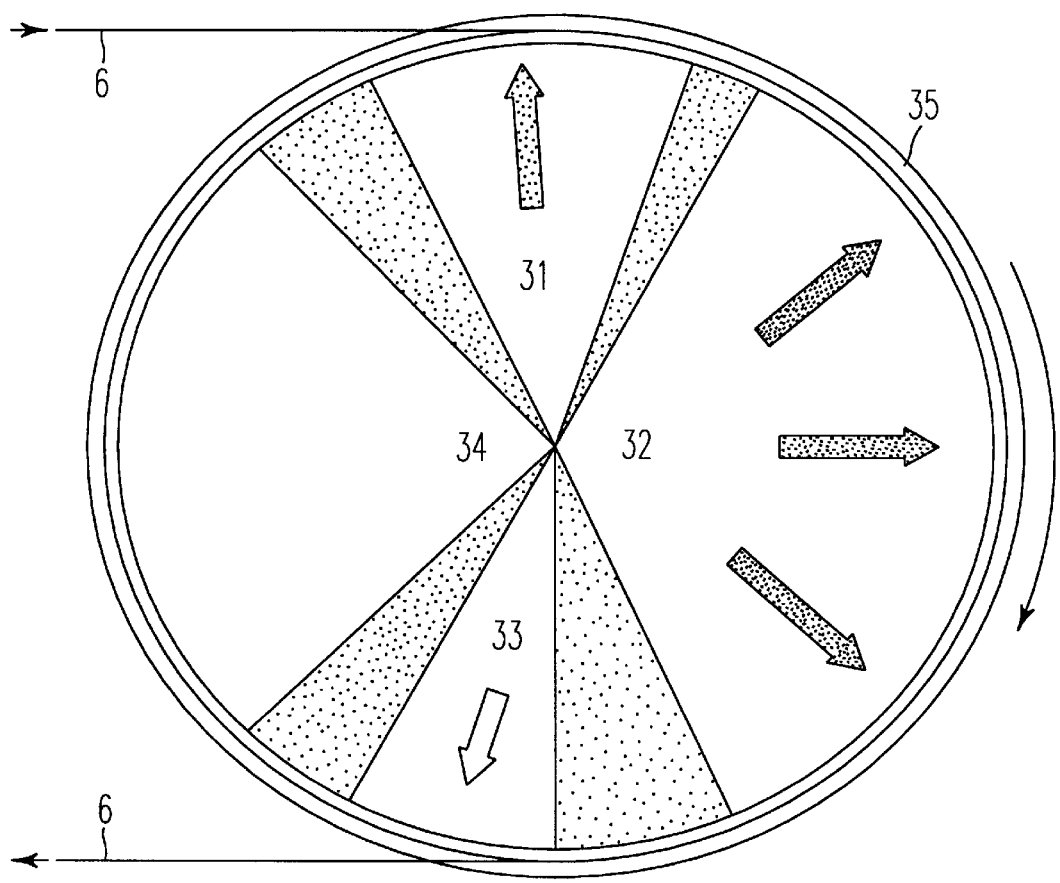
FIG. 2 A diagrammatic view of an impregnating wheel in side view.

FIG. 2 shows diagrammatically the operation of the impregnating wheel. The fibre bundle 6 runs over the contact surface 35 rotating at the same speed, whereas the hub area is fixed. The first area 31 is used for heating the incoming fibre bundle, where heated air flows through the contact surface at the fibre bundle. The actual impregnating process takes place in the second area 32, where the liquid matrix material is forced at an elevated pressure through the contact surface and the fibre bundle to be impregnated until the desired degree of impregnation is reached at the end of the area. As the impregnating process takes place over a large angular range, there must be an adequate impregnating time for complete impregnation. Thus, the necessary matrix pressure, which acts vertically against the fibre bundle, can be kept as low as possible. A low internal pressure also reduces the necessary fibre bundle tension. The throughput can be increased by means of an increased rotary speed of the contact surface 35. In the third area 33 the impregnated fibre bundle is separated from the contact surface 35. The fibre bundle can leave the contact surface 35 with thermostatically controlled air, elevated pressure and through the given drawing-off direction. In the final area 34 there is no fibre bundle on the contact surface 35, which can once again be prepared for receiving the fibre bundle. The individual areas are also to be understood as closed chambers, whose walls are firstly constituted by the shaped areas of the fixed hub and secondly by the contact surface rotating at the fibre bundle speed. The necessary media are supplied from the outside into the chambers by connecting pieces.

Figure 3:
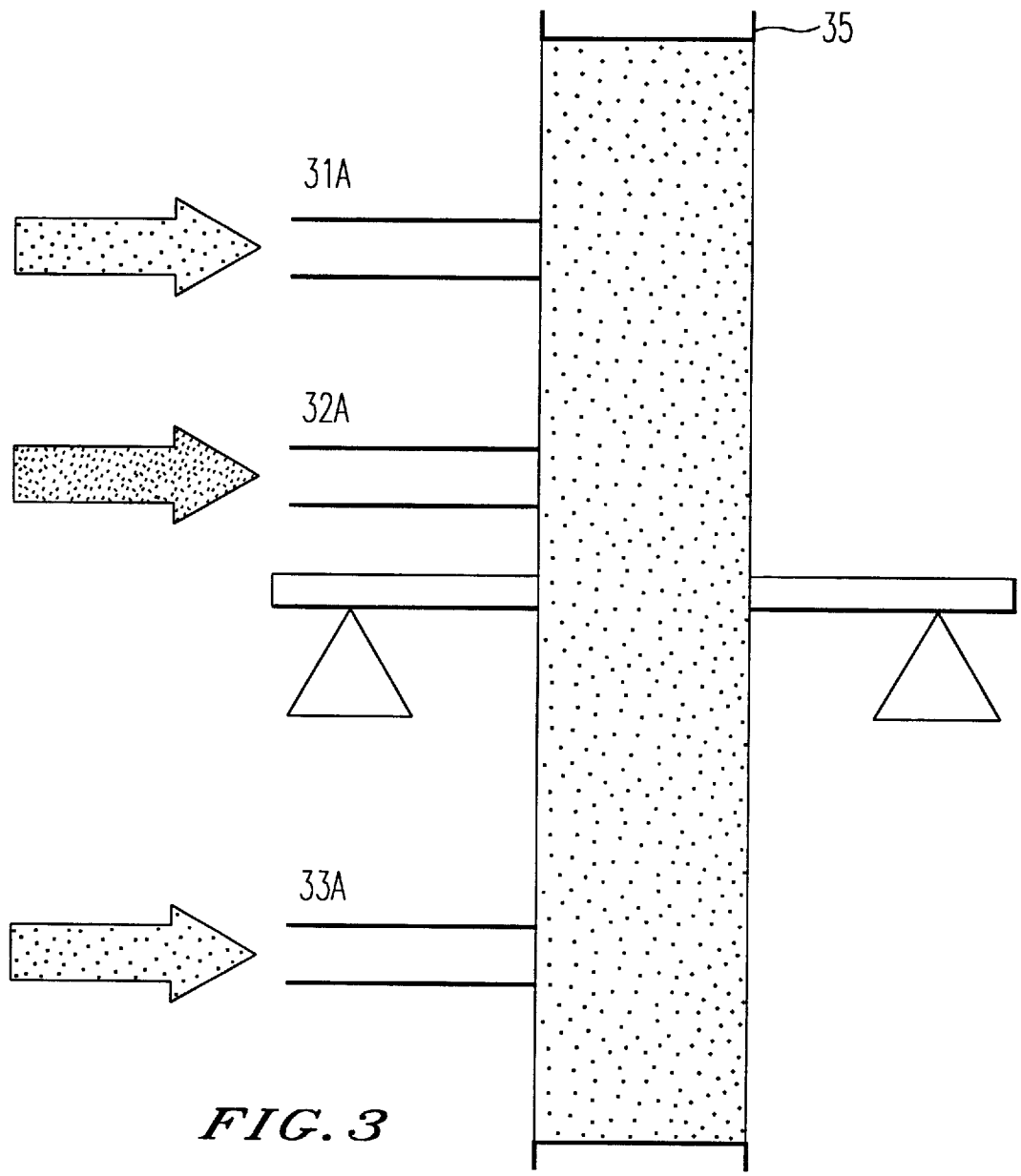
FIG. 3 A diagrammatic sectional representation of an impregnating wheel.

FIG. 3 shows the impregnating wheel in plan view. The contact surface 35 is permeable for the liquid matrix material and rotatable. The contact surface width corresponds to that of the fibre bundle obtained. The marginal areas are raised somewhat. Heated air is passed into the area 31 through the supply device 31a. The supply device 32a passes the liquid matrix material to the impregnating device. Thermostatically controlled air at an elevated pressure is passed through the supply device 33a into the area 33.

Figure 4:
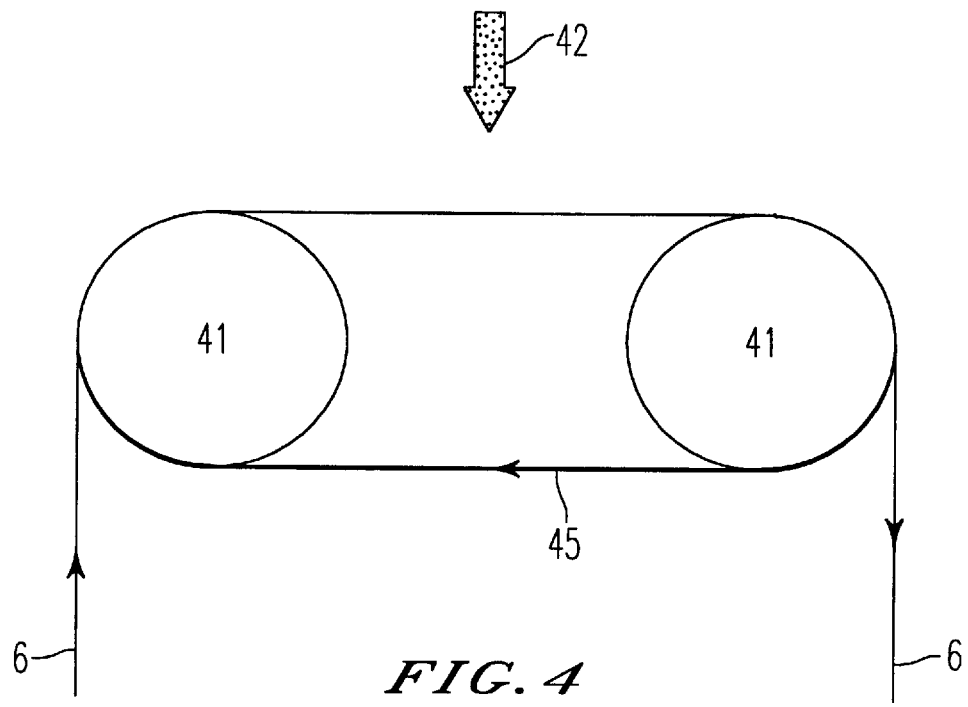
FIG. 4 A diagrammatic representation of a rotary impregnating belt.

FIG. 4 shows another embodiment of the invention. A rotating belt 45, which can also be built up from chain links, runs over two or more rolls 41. The fibre bundle 6 is received from the revolving belt 45 and led past the impregnating device 42. In the presently shown embodiment the matrix material is pressed from above, i.e. initially through the fibre bundle and then through the bearing surface. Here again it is advantageous if the bearing surface is permeable for the matrix material.

Figure 5:
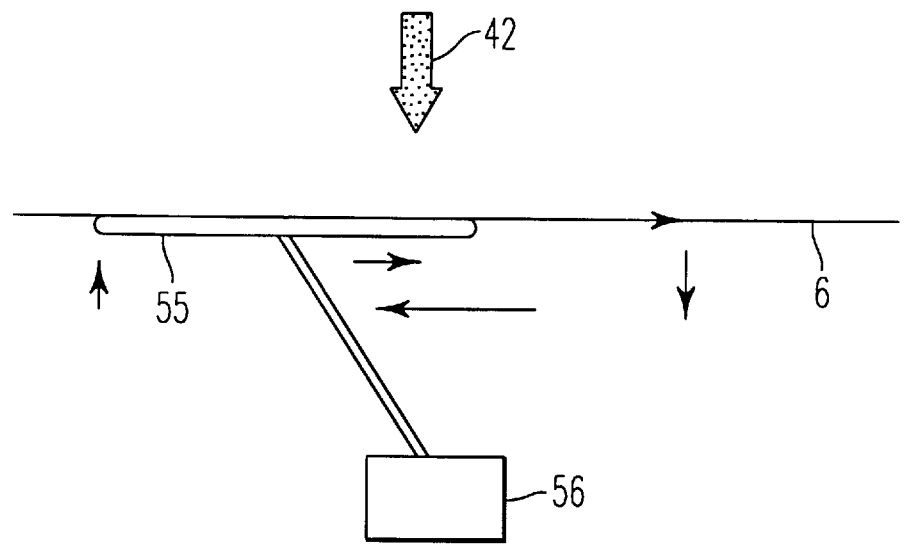
FIG. 5 A diagrammatic representation of a support with return mechanism.

In FIG. 5 the fibre bundle 6 is led with a support 55 past the impregnating device 42. The support 55 initially moves at the speed of the fibre bundle 6 and is then moved initially downwards by a return device 56 and then at high speed back to the starting position. Through a skilled control of the return device 56, in conjunction with a time and/or space control of the impregnating device 42, it is possible to ensure that each part of the fibre bundle is uniformly impregnated whilst being supported from below.

FIG. 6 generally shows how fluids can flow through a homogeneous body. A homogeneous body 60 is shown through which a fluid flows from below. The arrows 62 indicate the flow direction and correspond to the impregnating device supplying a matrix material. The arrows 61 indicate that the fluid passes uniformly out of the exit surface of the homogeneous body 60, because the latter has a homogeneous penetration resistance over its entire volume.

With reference to FIG. 7 the significance of the principle of the uniform through-flow in the case of fibre bundle impregnation is described. A fibre bundle 6, unwound from a roving or a holder 1, comprises a large number of fibres, which can also be called filaments. On closer consideration of a fibre bundle 6, it can be seen that the filaments are not uniformly juxtaposed and superimposed over the width. There are areas 64 in which the filament planes are accumulated. These filament accumulations 69 are located along a fibre bundle at different points of the cross-sectional surface. For impregnation this means that the penetration resistance of a fibre bundle is not constant for the molten matrix material over the cross-section thereof. In filament accumulation areas the penetration resistance is high, whereas it is only low in areas consisting solely of a few filament planes. It is also possible for the matrix material to split the fibre bundle 6 on penetrating at a thin point 63 and then a large part of the matrix material flows through this gap in the fibre bundle 6 and consequently the pressure built up in the matrix material drops. Therefore there can be no impregnation at points with filament accumulations 64. As the filament distribution of a fibre bundle 6 can only be levelled out to a certain extent, the structure described with reference to FIGS. 7 and 8 offers a good possibility for ensuring a high degree of impregnation independently of the thickness distribution of the filament planes. A correspondingly designed support has its own inventive character.

This case is illustrated in FIG. 7. The fibre bundle 6 to be impregnated is firmly connected to a homogeneous, porous body 65, which can be part of the support and is constructed for receiving the fibre bundle and is permeable for the liquid matrix material. If said body 65 is firmly connected to the fibre bundle 6 to be impregnated, whose impregnation resistance is clearly lower and distributed in a non-uniform manner, then the flow through the fibre bundle takes place with a uniform flow front. This is due to the fact that in said fibre bundle 6 the matrix material can enter with a constant pressure and under constant flow speed conditions. The flow front flows uniformly through the fibre bundle 6, provided that the latter is not too thick compared with the thickness of the homogeneous body 65. The body 65 or that part of the support which receives the fibre bundle 6, must consequently have a constant penetration resistance, which is higher than that of the fibre bundle to be impregnated. Therefore there is a flow through the fibre bundle 6 in the radial direction with a continuous uniform matrix material flow front, which is independent of the filament distribution of the fibre bundle. This is brought about in that the body 6 is constructed as a cylinder portion with a high penetration resistance.

FIG. 8 shows the flow through the fibre bundle described in FIGS. 6 and 7 on an impregnating wheel described relative to FIG. 2. The contact surface 35 of the impregnating wheel is formed from a homogeneous layer of a material with a high penetration resistance. The contact surface 35 is traversed from the inside by the liquid matrix material and this is given the reference numeral 68 in the larger scale detail. As a result of this construction of the contact surface 35 there is a uniform flow front, so that there is a uniform flow through the outer fibre bundle 6. This takes place independently of whether the fibre bundle 6 has a uniform or a non-uniform thickness distribution.

I claim:

1. A process for fiber bundle impregnation, comprising the steps of:

placing a fiber bundle on a support, wherein said support is a wheel having a fixed hub region and a rotary contact surface which contacts the fiber bundle;

passing said rotary contact surface having the fiber bundle thereon past a matrix material impregnating device; and impregnating said fiber bundle with said matrix material from the impregnating device, wherein there is no relative movement between the rotary contact surface and the fiber bundle during said impregnating step.

2. The process of claim 1, wherein a tensile stress is exerted on said fiber bundle during said process.

3. The process of claim 1, wherein said fiber bundle is heated prior to said impregnating step.

4. The process of claim 1, wherein said matrix material passes through said rotary contact surface to said fiber bundle.

5. An apparatus for fiber bundle impregnation, comprising:

a movable support for receiving a fiber bundle, wherein said support is a wheel having a fixed hub region and a rotary contact surface which contacts the fiber bundle; and an impregnating device for impregnating the fiber bundle with a matrix material, wherein said movable support is located in an area for passing matrix material through said rotary contact surface to said fiber bundle from said impregnating device, and wherein said support is adapted such that there is no relative movement between the rotary contact surface and the fiber bundle during impregnating.

6. The apparatus of claim 5, wherein said support is adapted for receiving and impregnating a plurality of parallel fiber bundles.

7. The apparatus of claim 5, comprising a plurality of supports arranged in succession, wherein the rotary contact surfaces of said supports move in opposition to one another so as to permit impregnation from opposing sides of a fiber bundle.

8. The apparatus of claim 5, wherein said surface is permeable to said matrix material, said surface is homogeneously constructed so that there is a constant penetration resistance for said matrix material, said surface has a higher penetration resistance for said matrix material than the penetration resistance of the fiber bundle.

* * * * *